(12) United States Patent
Cheng et al.

(10) Patent No.: US 11,867,540 B2
(45) Date of Patent: Jan. 9, 2024

(54) BRILLOUIN OPTICAL TIME DOMAIN REFLECTOMETER WITH ULTRA-HIGH SPATIAL RESOLUTION BASED ON BIPOLAR DIFFERENTIAL PHASE ENCODING

(71) Applicant: Guangzhou Brillinnova Technology Co., Ltd., Guangdong (CN)

(72) Inventors: Linghao Cheng, Guangdong (CN); Baiou Guan, Guangdong (CN); Xiangjie Ma, Guangdong (CN); Jinding Zhu, Guangdong (CN)

(73) Assignee: Guangdong Brillinnova Technology Co., Ltd., Zhuhai (CN)

( * ) Notice: Subject to any disclaimer, the term of this patent is extended or adjusted under 35 U.S.C. 154(b) by 15 days.

(21) Appl. No.: 17/842,826

(22) Filed: Jun. 17, 2022

(65) Prior Publication Data
US 2022/0316922 A1    Oct. 6, 2022

Related U.S. Application Data

(63) Continuation of application No. PCT/CN2020/070085, filed on Jan. 2, 2020.

(30) Foreign Application Priority Data

Dec. 30, 2019 (CN) .......................... 201911402178.8

(51) Int. Cl.
*G01D 5/353* (2006.01)

(52) U.S. Cl.
CPC ................ *G01D 5/35364* (2013.01)

(58) Field of Classification Search
CPC ........................................................ G01D 5/353
See application file for complete search history.

(56) References Cited

FOREIGN PATENT DOCUMENTS

| CN | 103196584 A | 7/2013 | |
|---|---|---|---|
| CN | 104266752 A | 1/2015 | |
| JP | 2017044504 A | 3/2017 | |
| WO | WO-2015170355 A1 * | 11/2015 | ............. G01B 11/18 |

OTHER PUBLICATIONS

International Search Report of PCT Patent Application No. PCT/CN2020/070085 dated Sep. 25, 2020.

* cited by examiner

*Primary Examiner* — Tony Ko (57) ABSTRACT

The present disclosure provides a Brillouin optical time domain reflectometer with an ultra-high spatial resolution based on bipolar differential phase encoding, including a narrow-linewidth laser, a polarization maintaining coupler, a differential encoder, a Mach-Zehnder modulator, an optical pulse amplifier, an optical circulator and a sensing fiber, an optical amplifier, a coherent optoelectronic receiver, a sideband demultiplexer, and a result measurement module. By implementing the present disclosure, a spatial resolution for measuring a Brillouin scattering spectrum can be effectively improved, and measurement precision can be effectively improved by increasing a quantity of times of superposition and averaging. In addition, measurement performance can be effectively improved by directly using a bipolar encoding sequence.

9 Claims, 5 Drawing Sheets

BRILLOUIN OPTICAL TIME DOMAIN REFLECTOMETER WITH ULTRA-HIGH SPATIAL RESOLUTION BASED ON BIPOLAR DIFFERENTIAL PHASE ENCODING

CROSS REFERENCE TO RELATED APPLICATIONS

The present application is a Continuation Application of PCT Application No. PCT/CN2020/070085 filed on Jan. 2, 2020, which claims the benefit of Chinese Patent Application No. 201911402178.8 filed on Dec. 30, 2019. All the above are hereby incorporated by reference in their entirety.

TECHNICAL FIELD

The present disclosure relates to a field of distributed fiber optic sensing technologies, and in particular, to a Brillouin optical time domain reflectometer with an ultra-high spatial resolution based on bipolar differential phase encoding.

BACKGROUND

A Brillouin optical time domain reflectometry (BOTDR) is a distributed fiber optic sensing technology. A basic principle of the BOTDR is to emit a laser pulse with a narrow width (usually 10 ns to 500 ns) at one end of an optical fiber. When propagating along the optical fiber, the laser pulse may be subject, everywhere in the optical fiber, to Brillouin scattering caused by phonon in the optical fiber. Consequently, a part of the laser is scattered back in a reverse direction of propagation, and a frequency of a scattered laser has a frequency shift relative to a frequency of the emitted laser pulse. In a standard single-mode optical fiber, the frequency shift is about 10.8 GHz, which is called a Brillouin frequency shift. Time of scattering light at various locations of the optical fiber to reach a transmit end of the optical fiber are different according to distances of that are different. Therefore, time distribution of an acquired scattering light signal corresponds to spatial distribution of the scattering light. This is an optical time domain reflectometry (OTDR). The Brillouin frequency shift caused by Brillouin scattering is related (usually being in a linear relationship) to both a temperature and strain at a scattering location. Therefore, the temperature or strain at the scattering location can be inversed by measuring a frequency shift of a Brillouin scattering signal. Such a technology combining Brillouin scattering with the OTDR is called the BOTDR.

The Brillouin scattering signal has poor coherence, and thus has a specific line width. In the standard single-mode optical fiber, the line width is about 30 MHz, and a spectrum of the scattering signal is usually in a Lorenz spectrum. Because a Brillouin scattering spectrum has a specific width, the Brillouin frequency shift to be measured during sensing refers to a shift value of a center frequency of the Brillouin scattering spectrum (a Brillouin frequency). To obtain the center frequency, a conventional technical means is to obtain the entire Brillouin scattering spectrum by measuring at first. The spectrum is usually not a smooth spectrum due to noises. Therefore, Lorenz curve fitting further needs to be performed on an obtained scattering spectrum, to obtain an estimated spectrum with a smooth curve. Finally, a frequency corresponding to a peak location of the estimated spectrum with the smooth curve is found, to obtain the center frequency. Although, many different solutions are proposed to measure the Brillouin frequency shift, almost all solutions are based on measurement of the Brillouin scattering spectrum. In specific technical approaches, there may be roughly two types: a sweep-based solution and a fast Fourier transform (FFT)-based digital spectrum analysis solution. In the former solution, power of a signal in a narrow range near a frequency location in the Brillouin scattering spectrum is obtained by using a narrow band filter, and power at each frequency of the Brillouin scattering spectrum is obtained by changing a center frequency of the filter (sweeping), to obtain a shape of the entire Brillouin scattering spectrum. In the latter solution, FFT is performed on a Brillouin scattering signal, which is acquired in a period of time and is received in a broadband manner, to obtain the Brillouin scattering spectrum.

The prior art has the following disadvantages:

1. For the technology based on measurement of the Brillouin scattering spectrum, intensity detection of the Brillouin scattering signal is inevitable, because intensity information of the Brillouin scattering spectrum is most concerned. This means that a square operation of the Brillouin scattering signal must be performed to obtain the intensity information in a step during signal processing. The square operation enables all measured values, including a concomitant noise of the signal, to become positive values. After the noise is squared, a constant positive noise power level is calculated, which cannot be eliminated through multiple times of averaging and superposition, therefore, a final measurement distance of these technologies has been limited.
2. For the measurement of the Brillouin scattering spectrum, no matter whether the sweep-based solution or the FFT-based solution is used, frequency continuous analysis cannot be performed on the spectrum. Consequently, there is an inevitable frequency interval during frequency analysis, which limits a resolution of the spectrum and finally limits measurement precision.
3. A method of encoding for improving measurement performance is severely limited due to dependence of the intensity detection. Almost all encoding sequences that can be used are bipolar (1 or −1) binary sequences rather than unipolar (1 or 0) sequences. The intensity detection cannot detect −1. Consequently, a complex transformation from bipolar encoding to unipolar encoding needs to be performed on almost all encoding-based solutions proposed. In addition, the unipolar encoding is easily affected by an intensity noise and a non-linear effect, causing a severe limitation on performance.

SUMMARY

Embodiments of the present disclosure provide a Brillouin optical time domain reflectometer with an ultra-high spatial resolution based on bipolar differential phase encoding, to resolve technical problems mentioned in the background art.

To resolve the foregoing technical problem, an embodiment of the present disclosure provides a Brillouin optical time domain reflectometer with an ultra-high spatial resolution based on bipolar differential phase encoding, including:

a narrow-linewidth laser configured to emit a linear polarized laser;

a polarization maintaining coupler configured to divide the linear polarized laser into light of two paths of light, where the light of one path is transmitted to a Mach- Zehnder modulator for phase modulation, and the light of the other path is transmitted to a coherent optoelectronic receiver as a local oscillator light source;

a differential encoder configured to perform differential encoding on an original encoding sequence, where the original encoding sequence includes a first encoding sequence and a second encoding sequence, the first encoding sequence and the second encoding sequence are two groups of encoding sequences, and polarities thereof are opposite to each other;

the Mach-Zehnder modulator configured to perform phase modulation on a phase of the linear polarized laser based on an encoding sequence obtained by the performing differential encoding on the original encoding sequence, and output an optical pulse;

an optical circulator and a sensing fiber, where the optical circulator is configured to input the optical pulse into the sensing fiber, and receive Brillouin scattering light returned by the sensing fiber;

the coherent optoelectronic receiver configured to perform optoelectronic mixing coherent receiving on the local oscillator light source and the Brillouin scattering light to obtain a microwave signal, where the microwave signal includes a Stokes signal and an anti-Stokes signal;

a sideband demultiplexer configured to perform signal separation of the Stokes signal and the anti-Stokes signal in the microwave signal, and send the Stokes signal and the anti-Stokes signal to a result measurement module; and the result measurement module configured to calculate a first instantaneous frequency and a second instantaneous frequency based on the Stokes signal and the anti-Stokes signal, and calculate a final measurement result based on the first instantaneous frequency and the second instantaneous frequency.

Further, the result measurement module includes:

a first data collector configured to receive the Stokes signal and convert the Stokes signal into a first digital signal through analog-to-digital conversion;

a first differential demodulator configured to perform differential demodulation on the first digital signal;

a first correlator configured to perform a correlation operation on a signal, output by the first differential demodulator, with the original encoding sequence;

a first superposition averager configured to perform superposition and averaging on a correlation operation result output by the first correlator;

a first measurement unit configured to calculate the first instantaneous frequency based on a superposition and averaging result output by the first superposition averager;

a second data collector configured to receive the anti-Stokes signal and convert the anti-Stokes signal into a second digital signal through analog-to-digital conversion;

a second differential demodulator configured to perform differential demodulation on the second digital signal;

a second correlator configured to perform a correlation operation on a signal output by the second differential demodulator with the original encoding sequence;

a second superposition averager configured to perform superposition and averaging on a correlation operation result output by the second correlator;

a second measurement unit configured to calculate the second instantaneous frequency based on a superposition and averaging result output by the second superposition averager; and a third measurement unit configured to calculate the final measurement result based on the first instantaneous frequency and the second instantaneous frequency.

Further, the calculating the final measurement result based on the first instantaneous frequency and the second instantaneous frequency is specifically:

calculating an average value of the first instantaneous frequency and the second instantaneous frequency to obtain the final measurement result.

Further, the sensing fiber is a standard single-mode optical fiber or a plastic optical fiber.

Further, a line width of the narrow-linewidth laser is less than 100 kHz.

Further, the Mach-Zehnder modulator is an electro-optic Mach-Zehnder intensity modulator based on a lithium niobate waveguide.

Further, an optical pulse amplifier is further provided between the Mach-Zehnder modulator and the optical circulator, and the optical pulse amplifier is configured to perform power amplification on the optical pulse output by the Mach-Zehnder modulator based on a preset first power value, and input an optical pulse obtained by the power amplification on the optical pulse output by the Mach-Zehnder modulator to the optical circulator.

Further, an optical amplifier is further provided between the optical circulator and the coherent optoelectronic receiver, and the optical amplifier is configured to perform power amplification on the Brillouin scattering light emitted by the optical circulator based on a preset second power value, and input Brillouin scattering light obtained by the power amplification on the Brillouin scattering light emitted by the optical circulator to the coherent optoelectronic receiver.

Compared with the prior art, the present disclosure has the following beneficial effects:

The embodiments of the present disclosure provide the Brillouin optical time domain reflectometer with an ultra-high spatial resolution based on bipolar differential phase encoding, including the narrow-linewidth laser, the polarization maintaining coupler, the differential encoder, the Mach-Zehnder modulator, the optical pulse amplifier, the optical circulator and the sensing fiber, the optical amplifier, the coherent optoelectronic receiver, the sideband demultiplexer, and the result measurement module. By implementing the present disclosure, a spatial resolution for measuring a Brillouin scattering spectrum can be effectively improved, and measurement precision can be effectively improved by increasing a quantity of times of superposition and averaging. In addition, measurement performance can be effectively improved by directly using a bipolar encoding sequence.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

Figure 1:
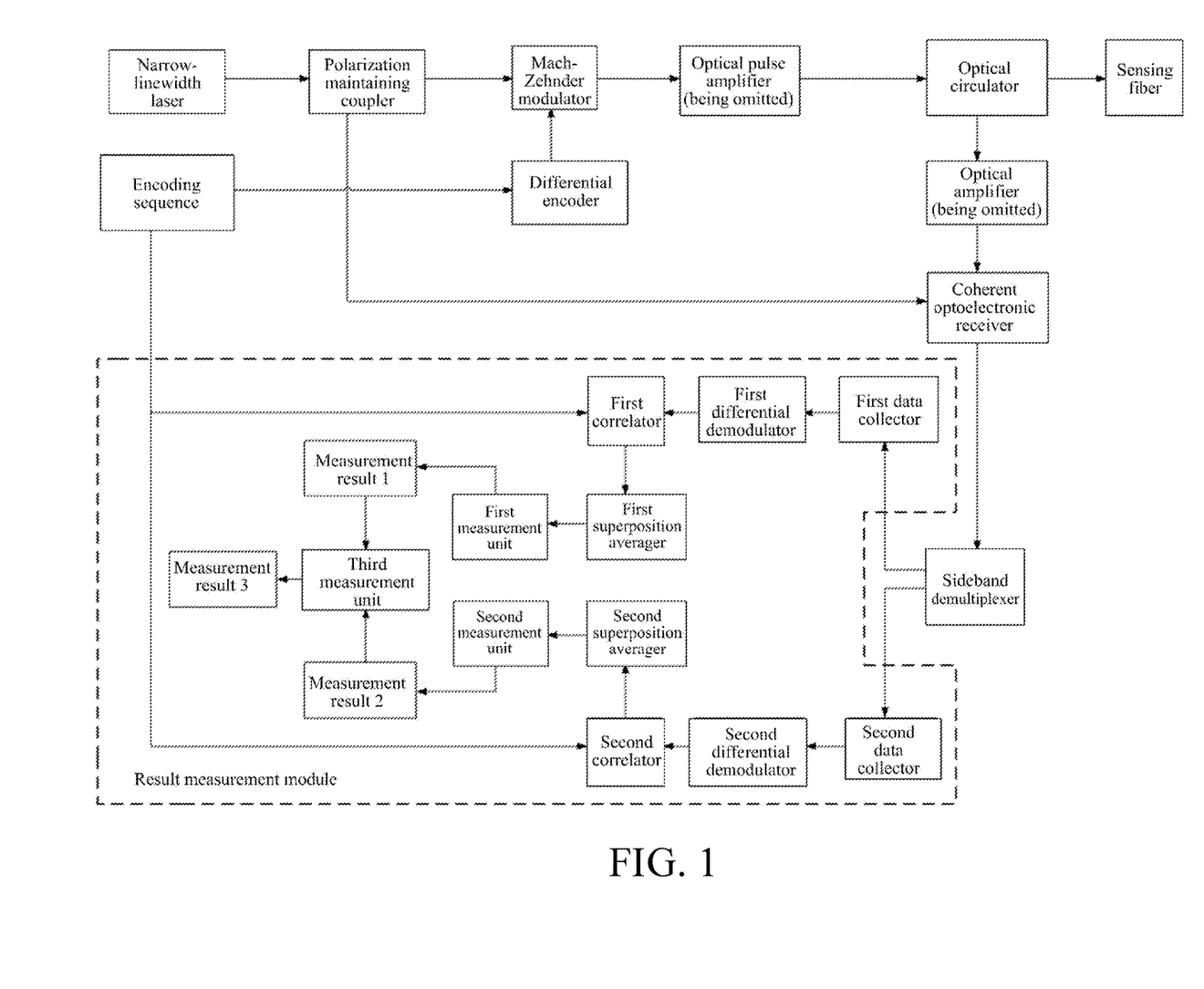
FIG. 1 is a schematic diagram of a structure of a Brillouin optical time domain reflectometer with an ultra-high spatial resolution based on bipolar differential phase encoding according to an embodiment of the present disclosure.

Refer to FIG. 1. An embodiment of the present disclosure provides a Brillouin optical time domain reflectometer with an ultra-high spatial resolution based on bipolar differential phase encoding, including:

a narrow-linewidth laser configured to emit a linear polarized laser;

a polarization maintaining coupler configured to divide the linear polarized laser into light of two paths of light, where the light of one path is transmitted to a Mach-Zehnder modulator for phase modulation, and the light of the other path is transmitted to a coherent optoelectronic receiver as a local oscillator light source;

a differential encoder configured to perform differential encoding on an original encoding sequence, where the original encoding sequence includes a first encoding sequence and a second encoding sequence, and the first encoding sequence and the second encoding sequence are two groups of encoding sequences whose polarities are opposite to each other;

the Mach-Zehnder modulator configured to perform phase modulation on a phase of the linear polarized laser based on an encoding sequence obtained by the performing differential encoding on the original encoding sequence, and output an optical pulse;

an optical pulse amplifier configured to perform, based on a preset first power value, power amplification on the optical pulse output by the Mach-Zehnder modulator (this optical pulse amplifier may be omitted in some applications), that is, to amplify power of the optical pulse to the preset first power value, where the preset first power value may be set based on a distance that needs to be sensed;

an optical circulator and a sensing fiber, where the optical circulator is configured to input the optical pulse into the sensing fiber, and receive Brillouin scattering light returned by the sensing fiber, and in this embodiment of the present disclosure, further, the sensing fiber is a standard single-mode optical fiber or a plastic optical fiber;

an optical amplifier configured to perform, based on a preset second power value, power amplification on the Brillouin scattering light emitted by the optical circulator (this amplifier may be omitted in some applications), that is, to amplify power of the Brillouin scattering light to the preset second power value, where the preset second power value may be set based on an input optical power range allowed by the coherent optoelectronic receiver;

the coherent optoelectronic receiver configured to perform optoelectronic mixing coherent receiving on the local oscillator light source and the Brillouin scattering light to obtain a microwave signal, where the microwave signal includes a Stokes signal and an anti-Stokes signal;

a sideband demultiplexer configured to perform signal separation of the Stokes signal and the anti-Stokes signal in the microwave signal, and send the Stokes signal and the anti-Stokes signal to a result measurement module; and the result measurement module configured to calculate a first instantaneous frequency and a second instantaneous frequency based on the Stokes signal and the anti-Stokes signal, and calculate a final measurement result based on the first instantaneous frequency and the second instantaneous frequency.

In this embodiment of the present disclosure, further, the result measurement module specifically includes:

a first data collector configured to receive the Stokes signal and convert the Stokes signal into a first digital signal through analog-to-digital conversion;

a first differential demodulator configured to perform differential demodulation on the first digital signal;

a first correlator configured to perform a correlation operation on a signal output by the first differential demodulator with the original encoding sequence;

a first superposition averager configured to perform superposition and averaging on a correlation operation result output by the first correlator;

a first measurement unit configured to calculate the first instantaneous frequency based on a superposition and averaging result output by the first superposition averager;

a second data collector configured to receive the anti-Stokes signal and convert the anti-Stokes signal into a second digital signal through analog-to-digital conversion;

a second differential demodulator configured to perform differential demodulation on the second digital signal;

a second correlator configured to perform a correlation operation on a signal output by the second differential demodulator with the original encoding sequence;

a second superposition averager configured to perform superposition and averaging on a correlation operation result output by the second correlator;

a second measurement unit configured to calculate the second instantaneous frequency based on a superposition and averaging result output by the second superposition averager; and a third measurement unit configured to calculate the final measurement result based on the first instantaneous frequency and the second instantaneous frequency.

In this embodiment of the present disclosure, further, the calculating the final measurement result based on the first instantaneous frequency and the second instantaneous frequency is specifically:

calculating an average value of the first instantaneous frequency and the second instantaneous frequency to obtain the final measurement result.

In this embodiment of the present disclosure, in a preferred solution, a line width of the narrow-linewidth laser is less than 100 kHz. (In some applications, a wide linewidth laser may alternatively be used, for example, when a measurement distance is short.)

In this embodiment of the present disclosure, in a preferred solution, the Mach-Zehnder modulator is an electro-optic Mach-Zehnder intensity modulator based on a lithium niobate waveguide. (In some applications, a non-lithium niobate waveguide may alternatively be used, for example, a silicon-based integrated photonic waveguide is used).

Figure 2:
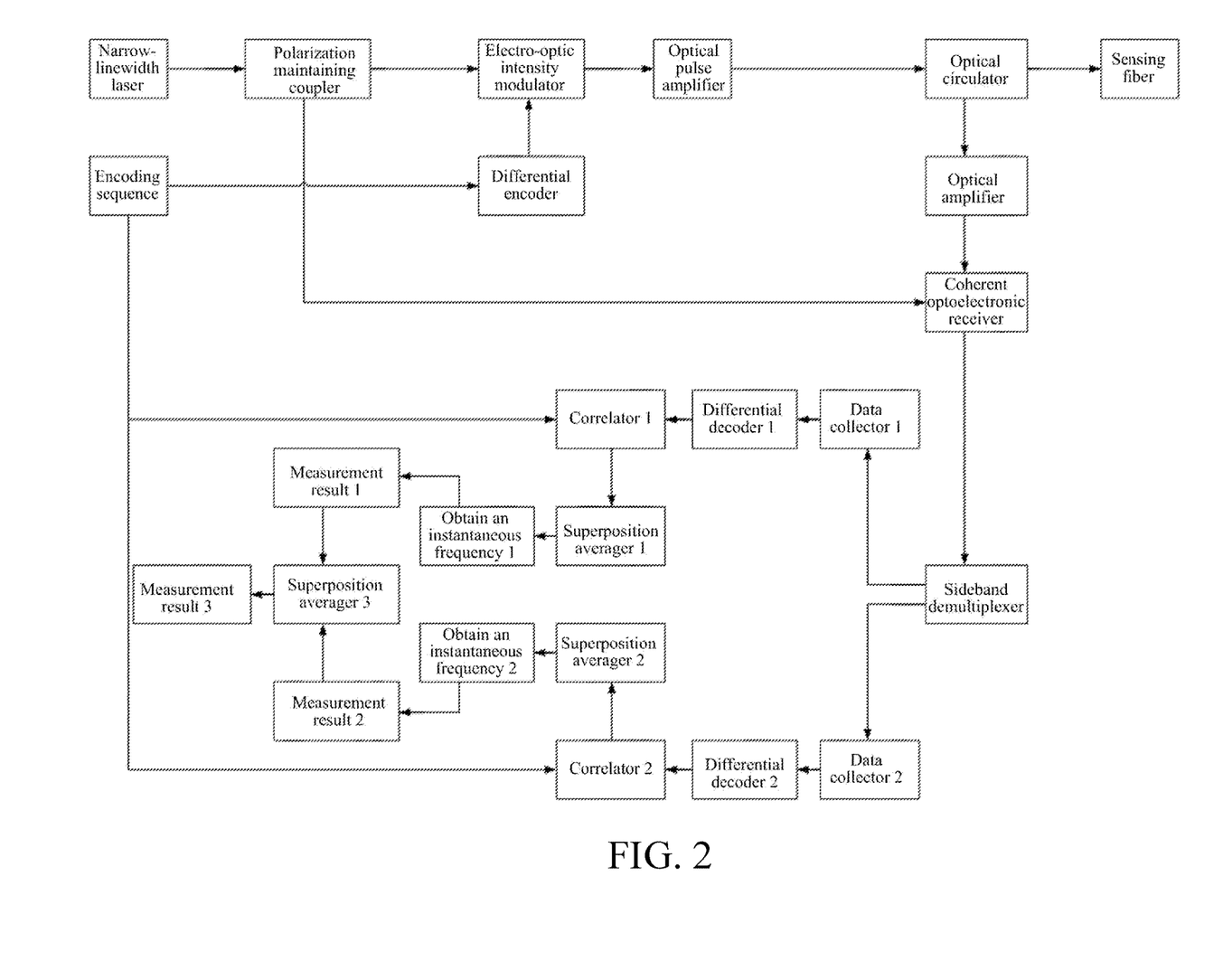
FIG. 2 is a schematic diagram of another structure of a Brillouin optical time domain reflectometer with an ultra-high spatial resolution based on bipolar differential phase encoding according to an embodiment of the present disclosure.

In order to better illustrate the technical solution of the present disclosure, the present disclosure is specifically illustrated below:

FIG. 2 is a block diagram of a solution of a Brillouin optical time domain reflectometer with an ultra-high spatial resolution based on bipolar differential phase encoding according to the present disclosure. Specifically:

A linear polarized laser output by a narrow-linewidth laser is divided into light of two paths by a polarization maintaining coupler. The light of one path enters a Mach-Zehnder modulator for modulation, and the light of the other path enters a coherent optoelectronic receiver as a local oscillator light source.

The Mach-Zehnder modulator is biased at a lowest power output point and modulates an encoding sequence obtained by performing differential encoding on an original encoding sequence onto a phase of the laser.

The Mach-Zehnder modulator is driven by a bipolar signal. The Mach-Zehnder modulator outputs a series of optical pulses. After being amplified to a proper power level by an optical pulse amplifier, these optical pulses enter a sensing fiber after passing through an optical circulator. When these optical pulses propagate in the sensing fiber, Brillouin scattering light propagating backward occurs at various locations of an optical fiber. The scattering light is amplified to a proper power level by the optical amplifier after passing through the optical circulator, and then enters the coherent optoelectronic receiver for optoelectronic mixing coherent receiving together with local oscillator light output by the narrow-linewidth laser.

If an output wavelength of the narrow-linewidth laser is 1550 nm, and the sensing fiber is a common standard single-mode optical fiber, a microwave signal with a center frequency of about 10.8 GHz is obtained after optoelectronic mixing coherent receiving. The microwave signal includes a Stokes signal and an anti-Stokes signal of Brillouin scattering.

After the microwave signal passes through a sideband demultiplexer, the Stokes signal and the anti-Stokes signal are separated, and are analog-to-digital converted into digital signals respectively by a data collector 1 and a data collector 2.

An output of the data collector 1 is used as an example. The output of the data collector 1 first enters a differential demodulator 1 to demodulate differential encoding. Then, a correlation operation is performed on an output of the differential demodulator 1 with an original encoding sequence, so that a series of results are obtained for a scattering signal generated by each emitted optical pulse after the correlation operation is performed. Before and after in time of these results represent near and far in space of generation locations of the scattering light. Then, a superposition averager 1 performs superposition and averaging on results obtained by multiple pulses at a same location, to improve a signal-to-noise ratio. An output result of the superposition averager 1 is used to calculate an instantaneous frequency 1 (that is, a first instantaneous frequency). The instantaneous frequency 1 may be used as a measurement result 1. The instantaneous frequency 1, that is, $\omega_1$ is calculated based on the following formula:

$$\omega_1 = \frac{\theta_1}{T}$$

Where $\theta_1$ is a phase of the output result of the superposition averager 1, and T is a sampling period of the data collector 1.

Based on a same method, an instantaneous frequency 2 (that is, a second instantaneous frequency), that is, $\omega_2$, may be calculated by the data collector 2, and may be used as a measurement result 2. Superposition and averaging are performed on two results to calculate a measurement result 3, that is, $\omega_3$:

$$\omega_3 = \frac{\omega_1 + \omega_2}{2}$$

A spatial resolution $\Delta z$ of the measurement result depends on an encoding rate used by a system:

$$\Delta z = \frac{cT}{2n_0}$$

Where c is a speed of light in a vacuum, and $n_0$ is a refractive index of a sensing fiber.

It should be noted that, in a preferred solution, the following is a description of some modules in the solution of the present disclosure:

(1) Narrow-linewidth laser: A line width of the laser needs to be narrow enough to ensure that there is no too much noise during coherent optoelectronic reception. In addition, frequency stability of the laser needs to be sufficient, to avoid interfering with the measurement result. A narrow-linewidth laser with a line width below 100 kHz is recommended.

(2) Mach-Zehnder modulator: The Mach-Zehnder modulator is a conventional electro-optic Mach-Zehnder intensity modulator based on a lithium niobate waveguide. When working, the modulator needs to be biased at a lowest output power point by using a direct current, that is, when no external modulation signal is added, the modulator has a lowest output power. The modulator is driven by a bipolar signal (that is, both a positive level signal and a negative level signal), so that the modulator converts input continuous light into switching between two phases with a difference of $\pi$ based on an input encoding sequence. Theoretically, the Mach-Zehnder modulator may alternatively be replaced with another type of modulator provided that the "input continuous light is converted into switching between two phases with a difference of $\pi$ based on an input encoding sequence" is implemented. However, currently, the Mach-Zehnder modulator described herein is widely used and has good performance.

(3) Coherent optoelectronic receiver and sideband demultiplexer: After passing through the sideband demultiplexer, a Brillouin scattering signal generated by the optical fiber is divided into a Stokes scattering signal and an anti-Stokes scattering signal, which are output separately.

(4) Data collector: The data collector, that is, an analog-to-digital converter, converts an analog signal into a digital signal. Signal processing after this module works in a digital domain. The two data collectors separately acquire a Stokes Brillouin scattering signal and an anti-Stokes Brillouin scattering signal.

Figure 4:
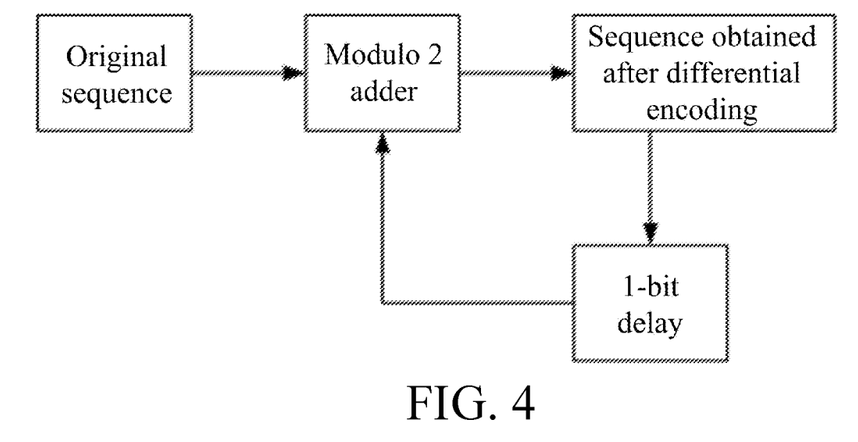
FIG. 4 is a schematic diagram of a structure of a differential encoder according to an embodiment of the present disclosure.

(5) Differential encoder:

The differential encoder is a conventional modulo 2 adder-based encoder, as shown in FIG. 4.

Figure 5:
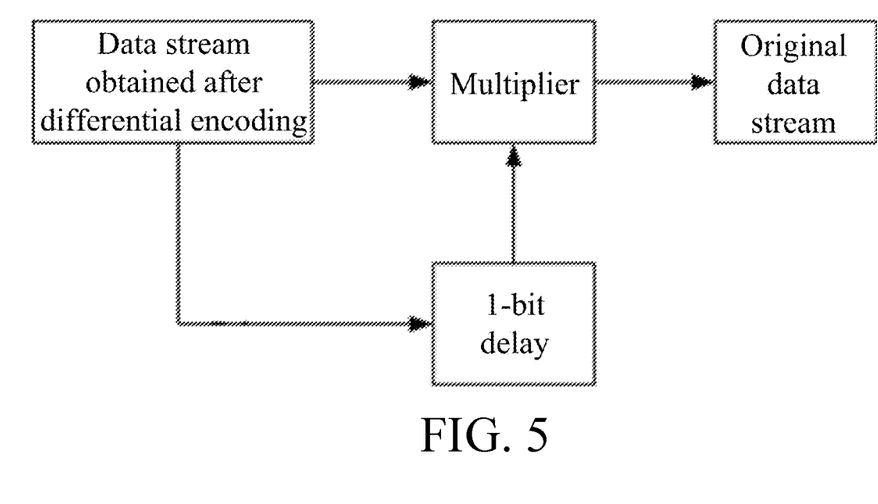
FIG. 5 is a schematic diagram of a structure of a differential decoder according to an embodiment of the present disclosure.

(6) Differential decoder:

The differential decoder is a conventional delay-based multiplier encoder, as shown in FIG. 5.

Figure 6:
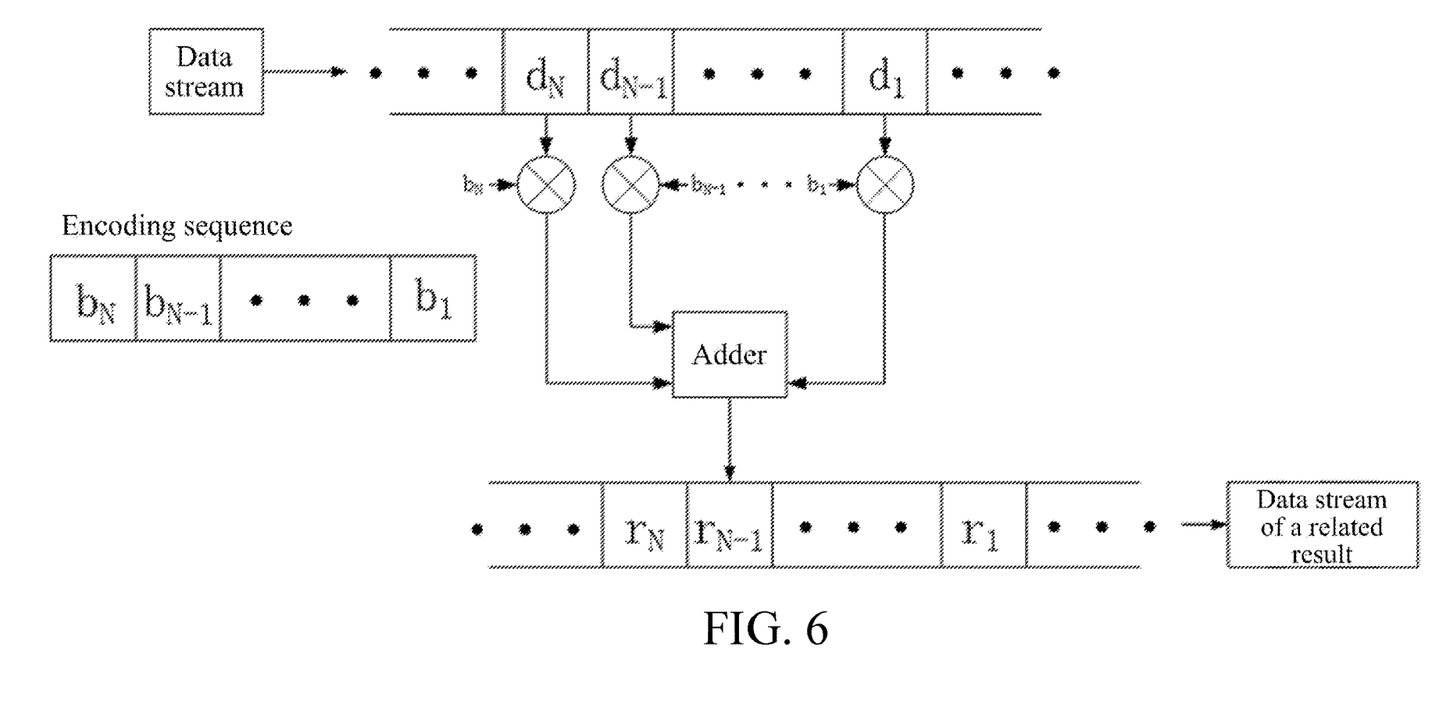
FIG. 6 is a schematic diagram of a structure of a correlator according to an embodiment of the present disclosure.

(7) Correlator:

The correlator is also in a conventional structure, works in a stream processing state, extracts N consecutive data from a flowing data stream, adds results obtained after multiplying N bits of the encoding sequence by bit, and outputs a new data stream, as shown in FIG. 6.

(8) Measurement result:

There are three measurement results in FIG. 2. The measurements 1 and 2 represent results of separately processing of the Stokes Brillouin scattering signal and the anti-Stokes Brillouin scattering signal. Accuracy of the measurement results 1 and 2 is affected by the frequency stability of the narrow-linewidth laser. A fluctuation of a laser frequency may interfere with the measurement results 1 and 2, resulting in a measurement error. When the laser frequency is very stable, the measurement results 1 and 2 each can be used as a final measurement result. The measurement result 3 is an average value of the measurement results 1 and 2. This result eliminates impact from the fluctuation of the laser frequency and is more accurate.

(9) Synchronization:

A system shown in FIG. 1 involves a lot of digital domain processing, including differential encoding, data collector, and all subsequent signal processing processes. Processing of these digital domains needs to work in a same clock domain, that is, used clocks thereof are derived from a same clock source.

Figure 3:
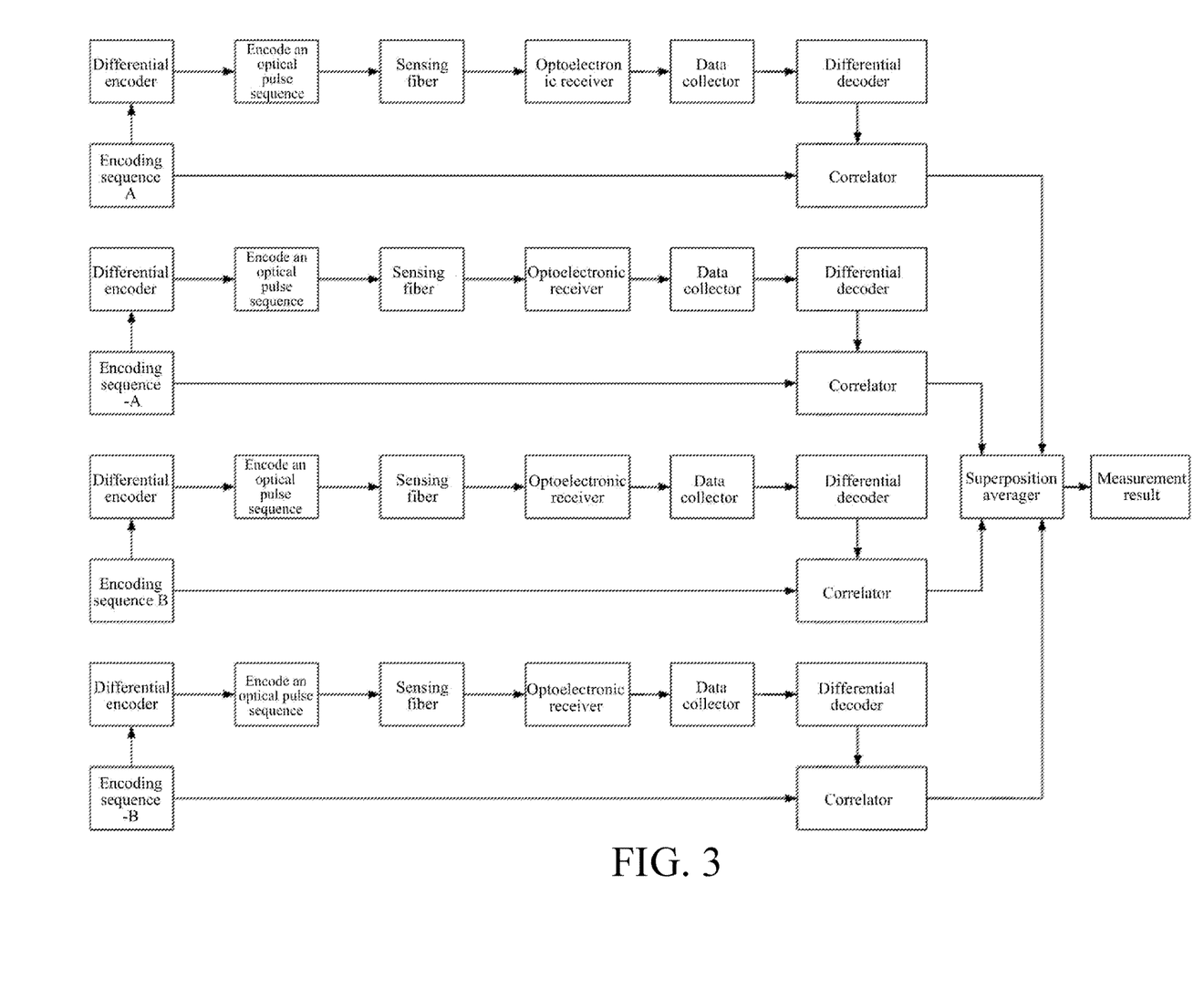
FIG. 3 is a schematic flowchart of completing one time of measurement by using a group of multiple different encoding sequences according to an embodiment of the present disclosure.

Refer to FIG. 3. In actual measurement, a group of multiple different encoding sequences needs to be transmitted in one time of complete measurement. In fact, for each transmitted binary encoding sequence A, another binary encoding sequence −A needs to be transmitted, that is, 1 in A is changed to 0, and 0 in A is changed to 1. By using this method, interference from a noise in the system to the measurement result can be eliminated. When the transmitted encoding sequence is a complementary sequence including the sequence A and a sequence B, another pair of complementary sequences −A and −B need to be transmitted. Likewise, 1 in A and B is changed to 0, and 0 in A and B is changed to 1. The transmitted complementary sequence is used as an example. In one time of measurement, a signal processing procedure between received signals obtained by transmitting these different encoding sequences is shown in FIG. 2. Similarly, an output of the data collector 1 is also used as an example.

Therefore, in one time of measurement, superposition and averaging need to be performed on all outputs of the correlator obtained by transmitting multiple different encoding sequences in a same group, and then an instantaneous frequency is calculated to obtain a measurement result.

Compared with the prior art, the present disclosure has the following beneficial effects:

(1) Simple signal processing. Complex algorithms such as spectrum analysis, spectrum fitting, and peak searching are not required. Only simple correlation operations and the superposition and averaging operation are required, which can be highly parallelized and pipelined, and can implement real-time signal processing.

(2) Extremely high spatial resolution. The spatial resolution depends on the encoding rate. Theoretically, a spatial resolution of two centimeters or an even better spatial resolution can be achieved, which cannot be currently achieved by other technologies.

(3) High encoding rate. A sensing system works in spontaneous Brillouin scattering. Therefore, a non-linear effect is greatly suppressed, and transmit power can be greatly improved, thereby improving system performance. In the prior art, a pulse transmit power is severely limited by the non-linear effect, transmit power is low, and a signal-to-noise ratio is low.

(4) Continuous frequency analysis. Theoretically, any measurement precision can be achieved, as long as there are enough quantity of times of superposition and averaging. In addition to being affected by the signal-to-noise ratio, measurement precision in the prior art is further limited to a spectrum resolution.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A Brillouin optical time domain reflectometer with an ultra-high spatial resolution based on bipolar differential phase encoding, comprising:

a narrow-linewidth laser configured to emit a linear polarized laser;

a polarization maintaining coupler configured to divide the linear polarized laser into light of two paths of light, wherein the light of one path is transmitted to a Mach-Zehnder modulator for phase modulation, and the light of the other path is transmitted to a coherent optoelectronic receiver as a local oscillator light source;

a differential encoder configured to perform differential encoding on an original encoding sequence, wherein the original encoding sequence comprises a first encoding sequence and a second encoding sequence, the first encoding sequence and the second encoding sequence are two groups of encoding sequences, and polarities thereof are opposite to each other;

the Mach-Zehnder modulator configured to perform phase modulation on a phase of the linear polarized laser based on an encoding sequence obtained by the performing differential encoding on the original encoding sequence, and output an optical pulse;

an optical circulator and a sensing fiber, wherein the optical circulator is configured to input the optical pulse into the sensing fiber, and receive Brillouin scattering light returned by the sensing fiber;

the coherent optoelectronic receiver configured to perform optoelectronic mixing coherent receiving on the local oscillator light source and the Brillouin scattering light, to obtain a microwave signal, wherein the microwave signal comprises a Stokes signal and an anti-Stokes signal;

a sideband demultiplexer configured to perform signal separation of the Stokes signal and the anti-Stokes signal in the microwave signal, and send the Stokes signal and the anti-Stokes signal to a result measurement module; and the result measurement module configured to calculate a first instantaneous frequency and a second instantaneous frequency respectively based on the Stokes signal and the anti-Stokes signal, and configured to calculate a final measurement result based on the first instantaneous frequency and the second instantaneous frequency.

2. The Brillouin optical time domain reflectometer with an ultra-high spatial resolution based on bipolar differential phase encoding according to claim 1, wherein the result measurement module comprises:
   a first data collector configured to receive the Stokes signal and convert the Stokes signal into a first digital signal through analog-to-digital conversion;
   a first differential demodulator configured to perform differential demodulation on the first digital signal;
   a first correlator configured to perform a correlation operation on a signal, output by the first differential demodulator, with the original encoding sequence;
   a first superposition averager configured to perform superposition and averaging on a correlation operation result output by the first correlator;
   a first measurement unit configured to calculate the first instantaneous frequency based on a superposition and averaging result output by the first superposition averager;
   a second data collector configured to receive the anti-Stokes signal and convert the anti-Stokes signal into a second digital signal through analog-to-digital conversion;
   a second differential demodulator configured to perform differential demodulation on the second digital signal;
   a second correlator configured to perform a correlation operation on a signal output by the second differential demodulator with the original encoding sequence;
   a second superposition averager configured to perform superposition and averaging on a correlation operation result output by the second correlator;
   a second measurement unit configured to calculate the second instantaneous frequency based on a superposition and averaging result output by the second superposition averager; and
   a third measurement unit configured to calculate the final measurement result based on the first instantaneous frequency and the second instantaneous frequency.

3. The Brillouin optical time domain reflectometer with an ultra-high spatial resolution based on bipolar differential phase encoding according to claim 1, wherein the calculating the final measurement result based on the first instantaneous frequency and the second instantaneous frequency is specifically:
   calculating an average value of the first instantaneous frequency and the second instantaneous frequency to obtain the final measurement result.

4. The Brillouin optical time domain reflectometer with an ultra-high spatial resolution based on bipolar differential phase encoding according to claim 2, wherein the calculating the final measurement result based on the first instantaneous frequency and the second instantaneous frequency is specifically:
   calculating an average value of the first instantaneous frequency and the second instantaneous frequency to obtain the final measurement result.

5. The Brillouin optical time domain reflectometer with an ultra-high spatial resolution based on bipolar differential phase encoding according to claim 1, wherein the sensing fiber is a standard single-mode optical fiber or a plastic optical fiber.

6. The Brillouin optical time domain reflectometer with an ultra-high spatial resolution based on bipolar differential phase encoding according to claim 1, wherein a line width of the narrow-linewidth laser is less than 100 kHz.

7. The Brillouin optical time domain reflectometer with an ultra-high spatial resolution based on bipolar differential phase encoding according to claim 1, wherein the Mach-Zehnder modulator is an electro-optic Mach-Zehnder intensity modulator based on a lithium niobate waveguide.

8. The Brillouin optical time domain reflectometer with an ultra-high spatial resolution based on bipolar differential phase encoding according to claim 1, wherein an optical pulse amplifier is further provided between the Mach-Zehnder modulator and the optical circulator, and the optical pulse amplifier is configured to perform power amplification on the optical pulse output by the Mach-Zehnder modulator based on a preset first power value, and input an optical pulse obtained by the power amplification on the optical pulse output by the Mach-Zehnder modulator to the optical circulator.

9. The Brillouin optical time domain reflectometer with an ultra-high spatial resolution based on bipolar differential phase encoding according to claim 1, wherein an optical amplifier is further provided between the optical circulator and the coherent optoelectronic receiver, and the optical amplifier is configured to perform power amplification on the Brillouin scattering light emitted by the optical circulator based on a preset second power value, and input Brillouin scattering light obtained by the power amplification on the Brillouin scattering light emitted by the optical circulator to the coherent optoelectronic receiver.

* * * * *